US005579458A

United States Patent [19]
Yokosuka et al.

[11] Patent Number: 5,579,458
[45] Date of Patent: Nov. 26, 1996

[54] DISPLAY CONTROL SYSTEM FOR A SCAN TYPE DISPLAY APPARATUS

[75] Inventors: Hirobumi Yokosuka; Yasuo Sakai; Kazuo Miyazaki, all of Hitachi, Japan

[73] Assignee: Hitachi, Ltd., Tokyo, Japan

[21] Appl. No.: 310,992

[22] Filed: Sep. 23, 1994

Related U.S. Application Data

[63] Continuation of Ser. No. 791,184, Nov. 13, 1991, abandoned.

[30] Foreign Application Priority Data

Nov. 13, 1990 [JP] Japan .................................... 2-306393

[51] Int. Cl.[6] ........................................ G06T 1/60

[52] U.S. Cl. ............................ 395/133; 395/507

[58] Field of Search .................... 395/144, 145, 395/146, 161, 164, 165, 166; 340/798, 799, 800

[56] References Cited

U.S. PATENT DOCUMENTS

| | | | |
|---|---|---|---|
| 4,112,423 | 9/1978 | Bertolasi | 395/153 X |
| 4,419,661 | 12/1983 | Hetsugi | 345/180 |
| 4,727,423 | 2/1988 | Kaneko et al. | 395/164 X |
| 4,858,107 | 8/1989 | Fedele | 395/164 X |
| 4,980,765 | 12/1990 | Kudo et al. | 345/203 |
| 5,047,755 | 9/1991 | Morita et al. | 345/120 |
| 5,199,102 | 3/1993 | Sakuragi | 395/164 X |
| 5,201,037 | 4/1993 | Kohiyama et al. | 395/164 X |
| 5,208,905 | 5/1993 | Takakura et al. | 395/145 X |
| 5,208,908 | 5/1993 | Harrison et al. | 395/164 X |
| 5,210,639 | 5/1993 | Redwine et al. | 395/164 X |
| 5,222,213 | 6/1993 | Petty | 395/164 |
| 5,233,689 | 8/1993 | Rhoden et al. | 395/164 X |

*Primary Examiner*—Heather R. Herndon
*Assistant Examiner*—Cliff N. Vo
*Attorney, Agent, or Firm*—Antonelli, Terry, Stout & Kraus

[57] ABSTRACT

A display control system for a scan type display apparatus in which a display screen is divided into a plurality of split display regions on a video screen and each display region is scanned in parallel. A dual port memory having a random access port and a serial access port is used as a display memory and display data is inputted through the random access port and outputted through the serial access port. Display addresses for reading out sequentially display data corresponding to each raster of every split display region one by one from the dual port memory are generated and the display data of each of the split display regions read out from the dual port memory are stored into each of the buffer memories. The display data stored in the buffer memories is read out and transferred to the scan type display device.

4 Claims, 5 Drawing Sheets

DISPLAY CONTROL SYSTEM FOR A SCAN TYPE DISPLAY APPARATUS

This application is a continuation of Ser. No. 07/791,184, filed Nov. 13, 1991, now abandoned.

BACKGROUND OF THE INVENTION

The present invention relates to a display control system for controlling a raster scan type display apparatus, and more particularly to a display apparatus in which a plurality of split display regions are scanned in parallel.

In a display apparatus, such as a cathode ray tube, the whole display region or screen is usually scanned by one scanning line raster. On the other hand, there are different types of display apparatus, for example, a liquid crystal display apparatus, in which a display region or screen is divided into two or more split display regions and the plural display regions are scanned in parallel.

In the ordinary display system which scans a plurality of split display regions in parallel, a random access memory is used as a memory for storing bit map display data to be displayed; and, drawing access for storing display data into the display memory and display access for reading out the stored display data are alternately carried out on a time-sharing basis.

This time sharing display system is able to designate addresses at random during the display access operation and, therefore, to alternately read out the display data from two or more memory regions disposed separately from each other and to supply the plurality of display data to the display device.

The display control system which uses a random access memory can realize a wrap-around scrolling by controlling the reading address of the display memory as described in Japanese Laying-open Patent Publication Sho-63-213,888.

In case a random access memory is used as a display memory in a high definition large scale display apparatus, the amount of data per unit time period read out from the display memory becomes large and competition between the display access operation and the drawing access operation of the display memory increases. As a result, the drawing speed becomes slow.

The above problem is solved by using a dual port display memory (hereinafter referred to as DPRAM) which is able to execute these two accesses simultaneously. In accordance with this technique, since the reading of data for display from the serial port of the DPRAM is executed by continuous addresses, the display addresses are required to be arranged so as to alternately read the data of plural display regions, for example, an upper display region and a lower display region, from the display memory using a time-sharing system. This means that the display addresses of the plurality of display regions have to be aligned alternately on the basis of the order of the continuous read addresses for the display memory and each data item of the respective display regions should be stored alternately in the display memory during the drawing process.

When only a partial region of the display is scrolled or shifted by varying the starting address of the read access, as shown in Japanese laying-open Patent Publication Sho 63-213888, this system causes the disadvantage that the display region which is not to be scrolled is also scrolled because one serial address is used for displaying.

Furthermore, the above technique has another disadvantage that the memory map of the display is quite different from that used in the ordinary random access memory and ordinary drawing software can not be used.

SUMMARY OF THE INVENTION

An object of the present invention is to provide a display controller having a dual port display memory to make it possible to set the same memory maps as that of the ordinary random access display memory.

Another object of the present invention is to provide a display controller with high drawing processing speed when applied to a high definition large scale display device and to make it possible to scroll a partial display region independently.

To accomplish the above objects, the display controller according to present invention includes a display control system for a raster scan type display apparatus in which a display region is divided into a plurality of split display regions on a video screen and each display region is scanned in parallel and comprises:

- a dual port memory having a random access port and a serial access port, display data being inputted through the random access port and outputted through the serial access port;
- a plurality of buffer memories each provided in correspondence to a respective split display region;
- means for generating display addresses to read out sequentially display data corresponding to each raster of every split display region one by one from said dual port memory;
- means for storing the display data of each of the split display regions read out from said dual port memory into a respective buffer memory, and
- means for reading out the display data stored in said buffer memories and for transferring the data to said raster scan type display device.

DESCRIPTION OF THE PREFERRED EMBODIMENT

Figure 1:
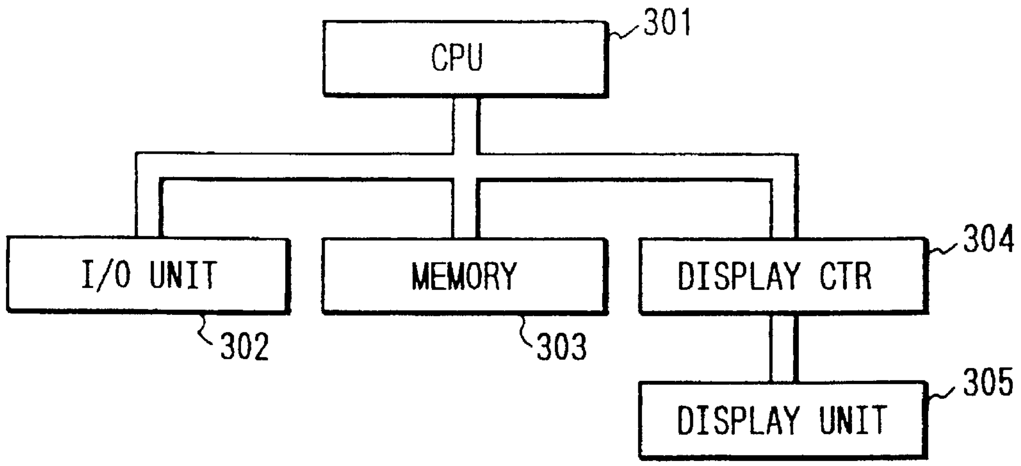
FIG. 1 is a block diagram showing a document editing apparatus according to the present invention.

As shown in FIG. 1, a document editing device includes a central processing unit (hereinafter referred to as a CPU) 301, I/O device 302 such as a key board and printer, a memory device including a random access memory 303, a display controller 304, and a display device 305. The display device 305, such as a liquid crystal display (LCD), has a display region or display screen including more split display frames or display regions.

When data representing pictures or characters are inputted by a user using the key board of the I/O device 302, the editing device displays the inputted pictures or characters on the video display screen 305 according to a program stored in the memory device 303. The operator can confirm the inputted document and print out the data using the printer 302 to obtain a copy of the desired document.

Figure 2:
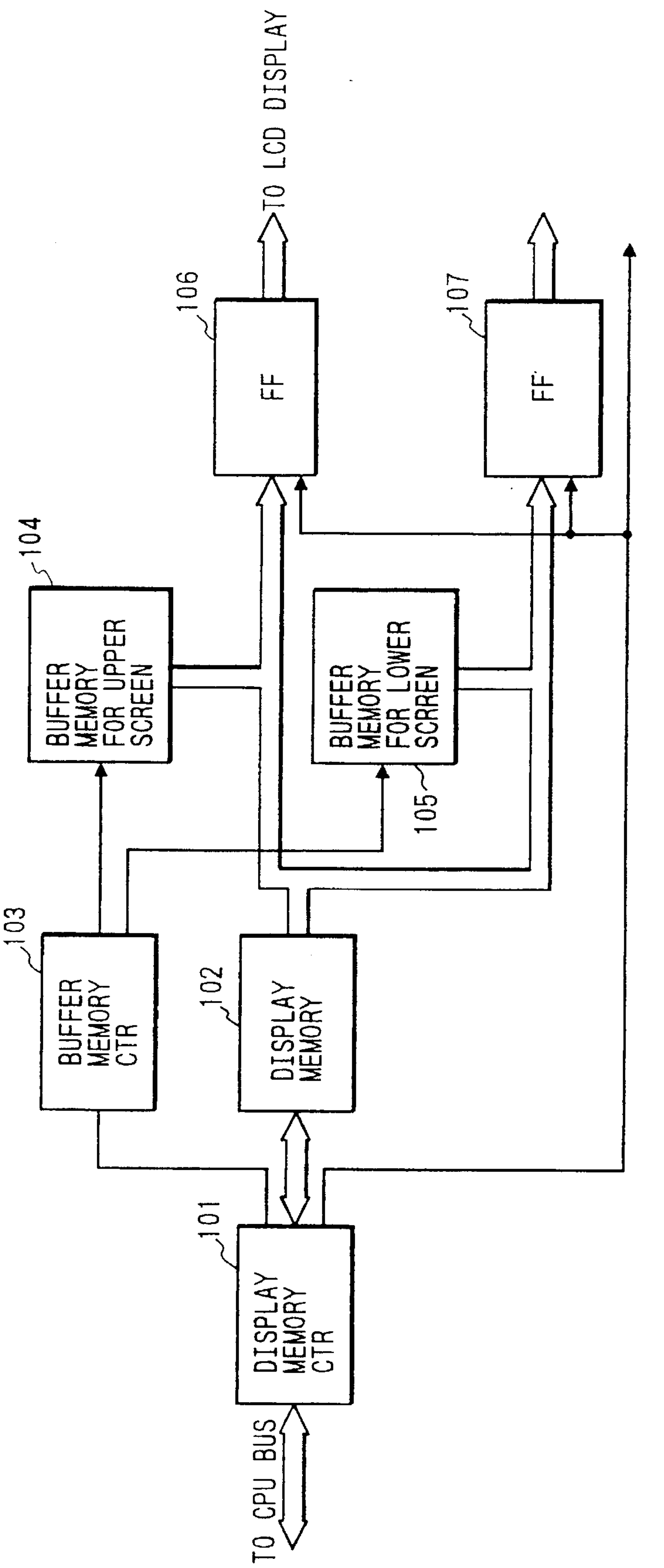
FIG. 2 is a block diagram of the display controller according to the present invention.

FIG. 2 shows in detail the architecture of the display control apparatus 304 of FIG. 1. In the embodiment, the display region or display screen 305 (FIG. 1) is divided into two or more split display regions or display screens, for example, upper and lower display regions of the LCD, with the screen size of 32 dots in the horizontal direction and 8 lines in the vertical direction. These two display regions are scanned simultaneously. The display control apparatus 304 (FIG. 1) includes a display memory 102 composed of a dual port random access memory, as shown in FIG. 2. A video random access memory control circuit 101 performs a refreshing of the dual port RAM 102, access control of the serial port and drawing access control via the random access port of the display memory 102 in response to the CPU. A buffer memory control circuit 103 performs address generation control and access control of the buffer memories 104 and 105 for the upper and lower display screen in response to control signals from the display control circuit 101.

Flip-flops 106 and 107 latch the display data being read out from the buffer memories 104 and 105 and send the data to the liquid crystal display element 305 (FIG. 1).

Figure 3:
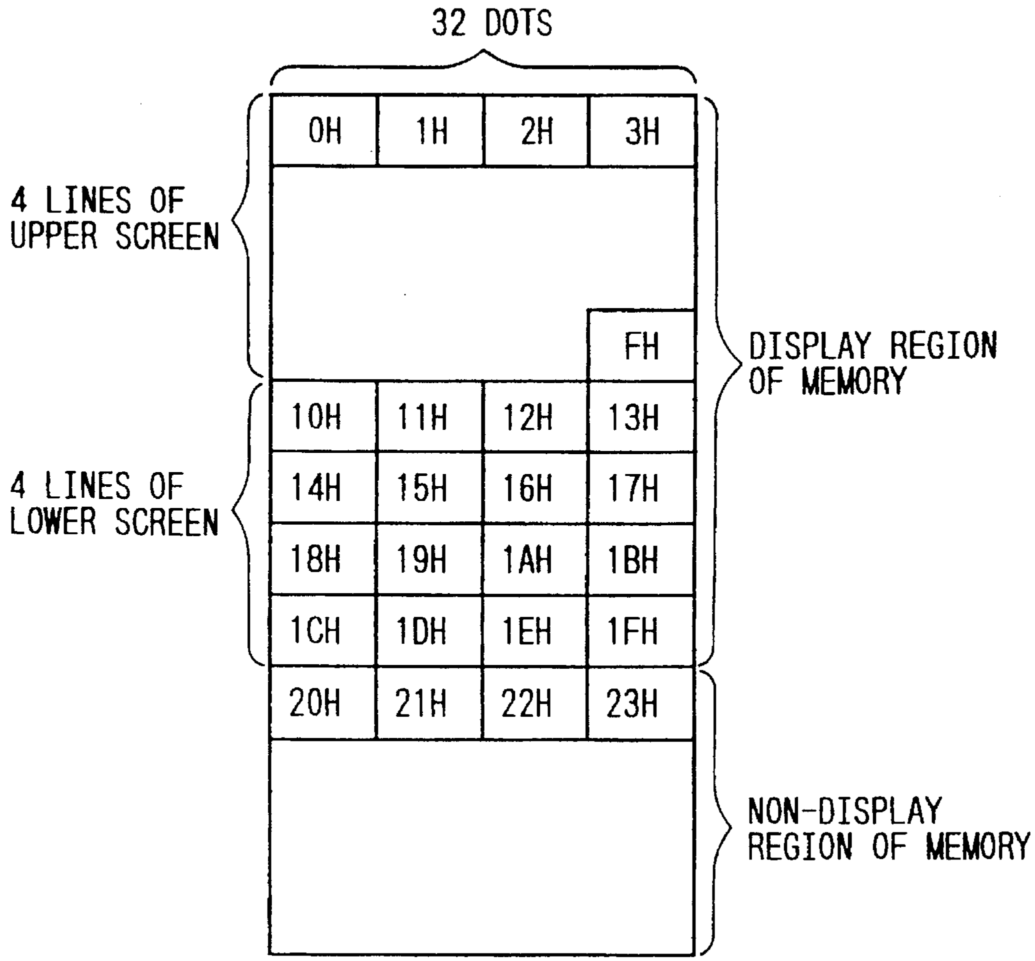
FIG. 3 is a table showing the relationship between the display screen and the display memory addresses.
Figures 4A, 4B, 4C, 4D, 4E, 4F, 4G, 4H, 4I, 4J:
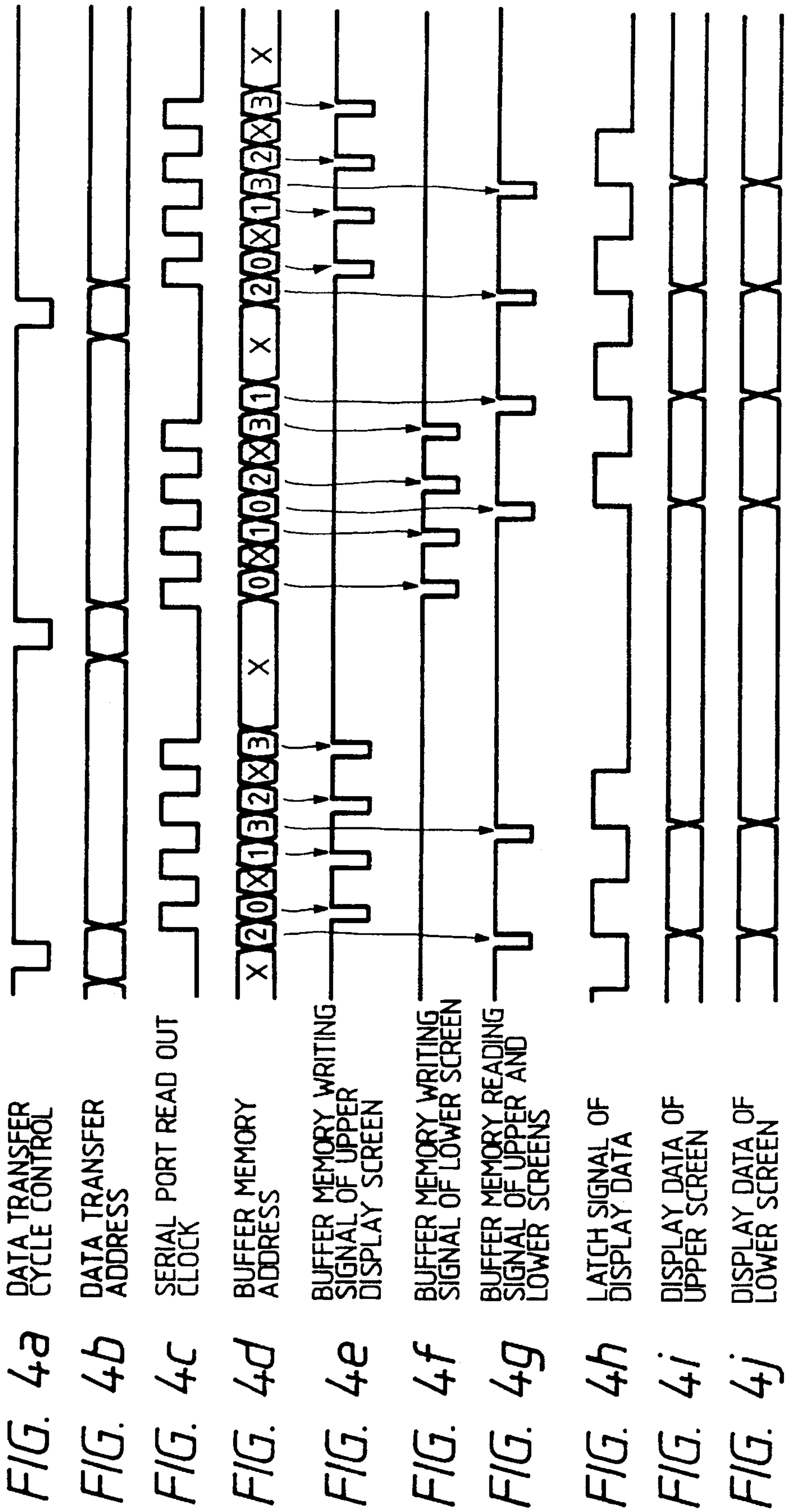
FIGS. 4*a*–4*j* are time charts explaining the operation of the display controller according to the embodiment of the present invention.

As shown in FIGS. 4*a*, 4*b*, and 4*c*, a serial port of the dual port display RAM starts operation in response to a top address being serially accessed and a data transfer cycle control signal (hereinafter referred as a DT cycle) and reads out sequentially the data in response to the serial port reading clock. The display memory control circuit 101 controls these DT cycles, as shown in FIG. 2. The display memory control circuit 101 carries out the drawing processing to the display memory 102 on the basis of an instruction from the CPU 301. First of all, the display data of the first line of the upper display is read out from the display memory 102. That is, the addresses are read out from OH to FH sequentially, as shown in FIG. 3, and are sequentially stored in the buffer memory 104 for the upper display screen according to the buffer memory addresses and buffer memory writing signals for the upper screen generated by the buffer memory circuit 103.

When one line of data of the upper display region is completely stored in the buffer memory 104, the display memory control circuit 101 starts a DT cycle of the lower display screen and reads sequentially the display addresses from addresses 10H to 1FH and stores them one after another in the buffer memory 105 of the lower display screen.

When the writing process of the buffer memory 105 for the lower display screen is started, buffer memory reading signals of the upper and lower display screens generated by the buffer memory control circuit 103 start the reading process simultaneously from both of the buffer memories 104 and 105 of the upper and lower display screens. Although at this stage, both the reading and writing processes of the display data are executed in parallel for the buffer memory 105 of the lower display screen with time sharing as shown in FIG. 4*d* to 4*g*, it is possible to read out the data after completion of writing of the data because the writing is 2 times faster than the reading in processing speed.

When the writing process for the lower display screen is completed, the writing process of the second line for the upper display screen to the buffer memory 104 is started. At this time, the reading process of the display data of the first line for the upper display from the upper display buffer memory 104 continues to be carried out at the same time. More than half of the display data of the first line has been read out at that time point, so the writing of the second line data never goes ahead of the reading of the first line.

The buffer memory control circuit 103 performs control of a series of buffer memory address and access operations in response to the DT cycle from the display memory control circuit 103. The display data read out from the buffer memories 104 and 105 are latched by the flip-flops 106 and 107 in response to the display data latch signal from the display memory control circuit 101 and then the data is transferred to the liquid crystal display device.

Figure 5:
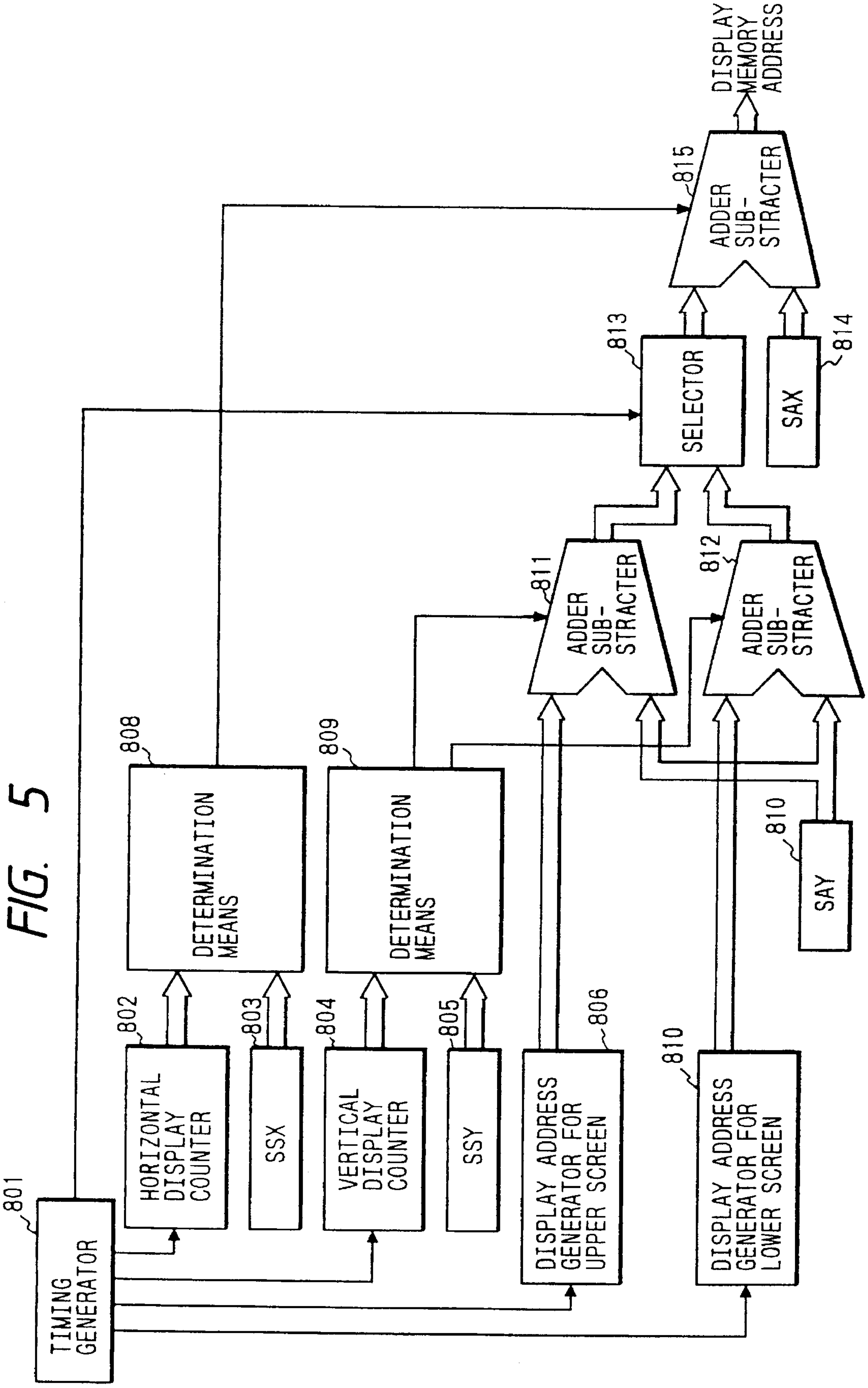
FIG. 5 a block diagram of a display memory address generator in a display memory control circuit.

FIG. 5 shows a display memory address generating part in the display memory control circuit 101 in detail. A timing generator 801 controls timing of the address generator. A horizontal display counter 802 counts the increment of the display address in the horizontal display direction and a register 803 determines a starting position of a scrollable split display region in the horizontal direction. A vertical counter 804 counts the increment of the display lines of the display in the vertical direction and a register 805 determines a starting position of the scrollable split display region in the vertical direction. A determination means 808 compares an output value from the horizontal display counter 802 with the value of the register 803; and when both values are the same, it supplies a signal indicating that the horizontal split position has been reached to an adder subtracter 815.

In FIG. 5, a determining means 809 compares the value of the vertical display counter 804 with the output value of register 805 and determines whether the set value of the register 805 belongs to the upper display region or the lower display region. Then, it supplies a signal indicating that the vertical split position has been reached on the basis of the result of the determination to the adder subtracter 811 for the upper display addresses or the adder subtracter 812 for the lower display addresses.

A display address generator for the upper display region 806 generates a reading address for the upper display region and a display address generator 807 for the lower display region generates a display address for the lower display region. Register 810 stores an off-set value of the display memory address corresponding to a scroll value when the split display region is scrolled in the vertical direction and the content thereof is supplied to the adder subtracters 811 and 812. The adder subtracters 811 and 812 add or subtract the off-set value of register 810 to or from the memory address of the upper or the lower display region.

The adder subtracters 811 and 812 transfer the display memory address by ignoring the value of the register 810 if a signal is generated that indicates that the position to be split has not been reached.

A selector 813 controls timing and changes over the outputs of adder subtracters 811 and 812 so as to supply a display reading address for the upper display region and a display address for the lower display region to the display memory 102 alternately.

A register 814 stores an off-set value of the display memory corresponding to the scroll value when the split display region is scrolled in the horizontal direction. The content thereof is transferred to the adder subtracter 815. The adder subtracter 815 adds or subtracts the off-set value of the register 814 to or from the display address.

When the determining means 808 supplies a signal indicating that a display position to be split has not been reached, the adder subtracter 815 transfers the display address to the display memory regardless of the value of the register 814.

FIG. 3 shows a display region having a horizontal width of 32 dots and a vertical width of 8 lines. Now, a scroll operation in which the lines after the 6th line are shifted by one line will be explained in detail. In the following operation, a very large value is set in the register 803 and the display region is not split in the horizontal direction. Basically, the scroll process in the horizontal direction is the same as that of scrolling in the vertical direction.

If values of 100, 6, an arbitrary value of and a value 4 are set in the registers 803, 805, 814, and 810, respectively, the horizontal counter 802 may count up to the maximum, count 4 in the horizontal direction. As the count does not reach the set value of 100 stored in register 803, the determining means 808 continues to supply a signal so as not to split the display screen in the horizontal direction. Therefore, the display address does not have a value added thereto or subtracted therefrom by the adder subtracter 815 in the horizontal direction.

The vertical display counter 804 renews its count value in proportion to the movement of the display lines from top to bottom. The determining means 809 determines whether the display split position is present in the upper display region or the lower display region. For example, since the display split position of the embodiment is the 6th line in the lower display region, a display split signal to the adder subtracter 811 of the display memory address for the upper display is not rendered active. A vertical splitting signal is generated and is supplied to the adder-subtracter 812 for the lower display region when the vertical display count value reaches a count equal to the difference between the set value of the register 805 and the upper display line number, that is, when the following formula is satisfied.

$$6-4=2$$

Where 6: set value of the register 805

4: line number of the upper display region

2: count of the vertical display

Figure 6:
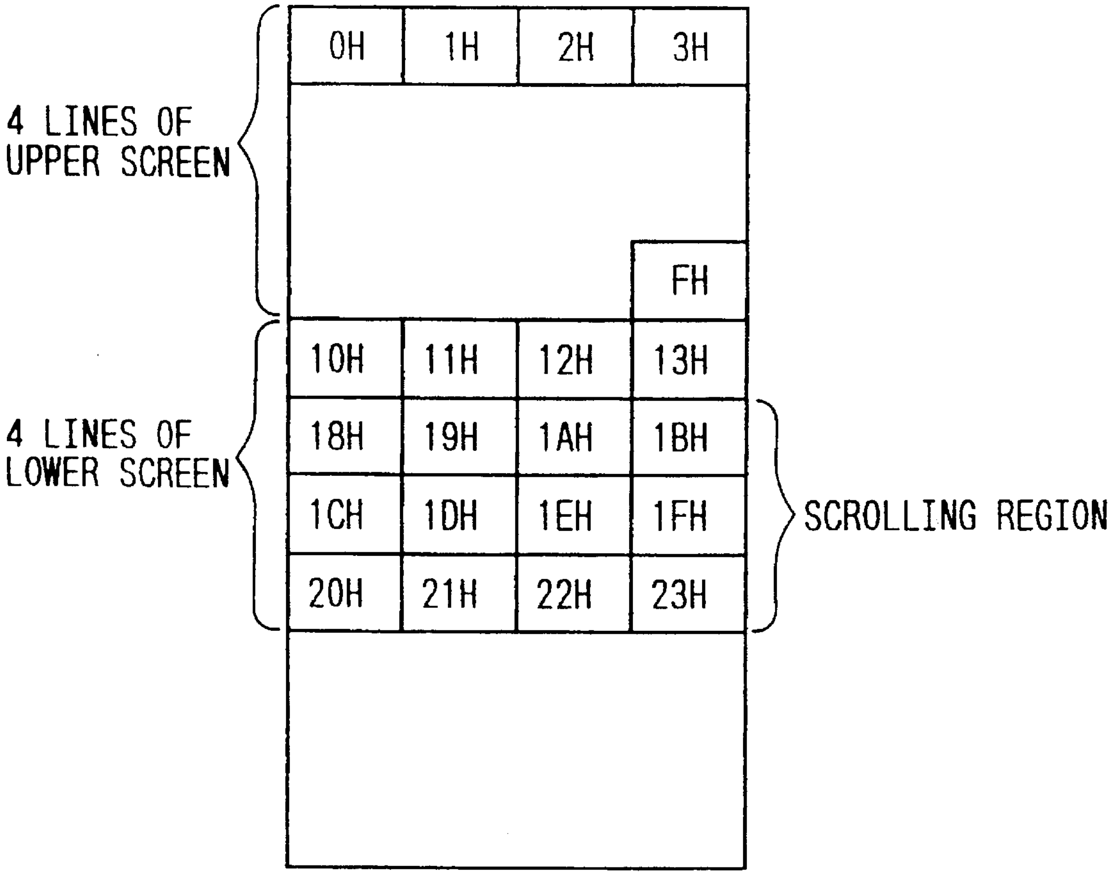
FIG. 6 is a table showing the relationship between the display screen and display memory addresses during a scrolling process.

The set value "4" of the register 810 is added to the display memory address of the lower display region by the adder subtracter 812. As a result, the display memory address is varied from 14H to 18H. Hereinafter, the display memory address is increased by "4" as shown in FIG. 6. All lines after the 6th are shifted or scrolled by one line, but the lines of the upper display region are not shifted or scrolled.

Therefore, if the registers are set as indicated above and only the display memory portion 20H to 23H is redrawn, the displayed image appears as if the 5th raster to the 8th raster were moved by one raster up on the display screen. Additionally, the dual port display memory is capable of executing a scrolling of the display at high speed by avoiding the competition between the display access and drawing access operations.

As described with reference to the embodiment the present invention, the address map set by the CPU is the same as that of the time sharing system using the ordinary random access memory, and therefore, the same drawing processing software is applicable to the present invention without change of the drawing method.

Furthermore, the ordinary time sharing system executes the drawing access and display access operations to the display memory through only one port. On the other hand, the present invention carries out the drawing access and display access operations through separate ports of the dual port display memory. As a result, the speed of the drawing process becomes fast because the competition between the drawing access and display access is avoided. Despite using the dual port memory as the display memory, high speed partial scrolling of the display screen is ensured.

As the buffer memory only needs sufficient capacity to store one raster of display data for each of the display regions scanned in parallel, it is possible to place the buffer memory in the LSI of a display controller and reduce the size of the apparatus. According to the present invention as described above, it is possible to provide a display controller using a dual port memory to which the same memory map as that of the display memory using the ordinary random access memory is applicable.

Additionally, when applied to a high definition large scale display device, the present invention ensures that drawing processing will be carried out at a high speed and that partial scrolling of the display screen is possible.

We claim:

1. A display control system for a scanning type liquid crystal display apparatus in which a liquid crystal display screen is divided into a plurality of split display regions and respective display regions are simultaneously scanned in parallel, comprising:

- a dual port memory having a random access port and serial access port, display data being inputted through the random access port and outputted through the serial access port;
- a plurality of buffer memories, each buffer memory provided in correspondence to a respective split display region for memorizing portions of said display data corresponding to at least one raster of the split display region;
- means for generating display addresses to read out sequentially display data corresponding to each raster of every split display region one by one from said serial access port of said dual port memory to the buffer memories;
- an operating means for adding or subtracting an address value corresponding to a scroll value to or from the display addresses which access display data of a split display region to be scrolled during scrolling of the split display region;
- means for alternately storing the display data corresponding to each raster of the split display regions read out from said serial access port of said dual port memory into each of said buffer memories based on said display addresses; and
- means for simultaneously reading out the display data stored in said buffer memories for transferring said display data to said plurality of split display regions of said scanning type liquid crystal display apparatus.

2. A display control system according to claim 1, characterized in that, each of said plurality of buffer memories has less capacity for memorizing display data corresponding to each raster of said respective split display regions than a capacity of said dual port memory.

3. A display control system according to claim 1, characterized in that, said plurality of buffer memories operate to memorize said display data at a faster speed than a reading out speed of the display data.

4. A document editing system including a display control system for a scanning type liquid crystal display apparatus in which a liquid crystal display screen is divided into a plurality of split display regions, and respective display regions are simultaneously scanned in parallel, comprising:

a dual port memory having a random access port and a serial access port, display data being inputted through the random access port and outputted through the serial access port;

a plurality of buffer memories, each buffer memory provided in correspondence to a respective split display region for memorizing portions of said display data corresponding to at least one raster of the split display region;

means for generating display addresses to read out sequentially display data corresponding to each raster of every split display region one by one from said serial access port of said dual port memory to said buffer memories;

an operating means for adding or subtracting an address value corresponding to a scroll value to or from the display addresses which access display data of a split display region to be scrolled;

means for alternately storing the display data corresponding to each raster of the split display region read out from said serial access port of said dual port memory into each of said buffer memories based on said display addresses; and means for simultaneously reading out the display data stored in said buffer memory for transferring said display data to said plurality of split display regions of said scanning type liquid crystal display apparatus.

* * * * *